United States Patent [19]
Ichikawa

[11] Patent Number: 5,844,974
[45] Date of Patent: Dec. 1, 1998

[54] EMERGENCY TELEPHONE COMMUNICATIONS SYSTEM

[75] Inventor: Yasuyo Ichikawa, Tokyo, Japan

[73] Assignee: NEC Corporation, Tokyo, Japan

[21] Appl. No.: 651,850

[22] Filed: May 21, 1996

[30] Foreign Application Priority Data

May 22, 1995 [JP] Japan .................................... 7-122186

[51] Int. Cl.⁶ .......................... H04M 15/00; H04M 11/04; H04M 3/42; H04M 1/64
[52] U.S. Cl. ............................ 379/138; 379/113; 379/45; 379/48; 379/207; 379/69
[58] Field of Search ................................. 379/67, 88, 89, 379/112, 113, 132, 133, 134, 135, 137, 138, 201, 207, 219, 220, 221, 265, 266, 45, 37, 46, 47, 48, 67.1, 88.01, 69

[56] References Cited

U.S. PATENT DOCUMENTS

| | | | |
|---|---|---|---|
| 4,839,892 | 6/1989 | Sasaki | 379/45 |
| 5,249,223 | 9/1993 | Vanacore | 379/221 |
| 5,596,625 | 1/1997 | Leblanc | 379/45 |
| 5,692,033 | 11/1997 | Farris | 379/265 |

*Primary Examiner*—Paul Loomis
*Attorney, Agent, or Firm*—Sughrue, Mion, Zinn, Macpeak & Seas, PLLC

[57] ABSTRACT

An emergency telephone communications system allows communications during congestion in the event of disaster. The system includes an exchange and telephones connected to the line circuits thereof. The exchange sends a congestion generation signal to a control section to initiate emergency processing when a congestion detecting circuit detects more than a predetermined number of the line circuits in the off-hook state. The control section has a congestion management table listing subscribers and stores not-yet-serviced subscribers when congestion has occurred. The not-yet-serviced subscribers are successively selected from the congestion management table, and calling signals are sent to their telephones. When the subscribers go off-hook within a predetermined time, the control section controls the emergency dial pulse receiver circuit to be ready for reception, and then controls the switch to connect an emergency service trunk to the line circuits to send a tone signal or a voice message. Upon receipt of telephone numbers of the receiving parties sent from the subscribers, the exchanges at the receiving parties are called through the emergency trunk circuit. The telephones send telephone numbers of the receiving parties at a predetermined time after detection of incoming calls from the exchange, or after detection of a given signal.

7 Claims, 5 Drawing Sheets

EMERGENCY TELEPHONE COMMUNICATIONS SYSTEM

BACKGROUND OF THE INVENTION

1. Field of the Invention

The present invention relates to a telephone communications system for use during emergency situations such as disaster, etc. The present invention also relates to a telephone communications network according to a waiting, automatic calling system for communicating brief messages during emergency situations, and an exchange and a telephone used therefor.

2. Description of the Prior Art

Telephone communications systems on the public switched telephone network (PSTN) usually use an exchange for connection with a plurality of subscriber lines. The main configuration of the exchange is as illustrated in FIG. 1.

In FIG. 1, the exchange 10 is constructed of a switch 13 for line connections, line circuits (LCs) 14 connected to subscriber lines 2, trunk circuits (TRK) 11 connected to trunk lines 4 for transmitting communicating voice and signalling, a service trunk (SVT) 12 and a control section (CONT) 15 equipped with dial pulse receiver circuits (DPRs) 16 for receiving telephone numbers sent from the subscribers.

The operation of the exchange 10 illustrated in the drawing will now be explained.

When a subscriber 1 places a telephone off-hook, for example, the line circuit (LC) 14 of an exchange 10 which is connected to the telephone of the subscriber detects the off-hook state and sends a seizure signal to a control section (CONT) 15. The control section 15, after having secured an idle dial pulse receiver circuit (DPR) 16 in preparation for receipt, controls the switch (SW) 13 to establish a connection between the service trunk (SVT) 12 and the line circuit (LC) 14. The control section (CONT) 15 then executes control so as to send a dial tone to the service trunk (SVT) 12. The subscriber 1 hears this dial tone through the receiver to be thereby notified that the exchange is ready to receive a dial signal.

When the subscriber dials the telephone number of the receiving party for connection after having heard the dial tone (DT), the dialed telephone number is detected through the line circuit (LC) 14 and sent to the dial pulse receiver circuit (DPR) 16. The control section (CONT) 15 analyzes the telephone number and selects a trunk circuit (TRK) 11 connected to the trunk line 4 determined by the receiving party. The exchange 10 at the receiving end is then notified of the telephone number through the trunk circuit (TRX) 11, while the switch (Sw) 13 is controlled to connect the line circuit (LC) 14 to the selected trunk circuit (TRX) 11.

The exchange 10 at the receiving end analyzes the received telephone number to effect the necessary connecting operations, and finally sends an answer back after having detected an answer signal from the receiving party which indicates the off-hook state of that party. The control section (CONT) 15 is notified of completion of the connection upon receipt of the answer sent back from the exchange at the receiving end which is sent to the control section (CONT) 15 via the trunk circuit (TRK) 11, and begins the operations necessary for charging, statistic data acquisition, etc. Since this has no connection with the present invention, no further explanation thereof will be given. When a conversation has ended, the CONT 15 detects a clear-forward or clear-back signal indicating the on-hook state of the calling subscriber or the called subscriber through the line circuit 14 to terminate charging and to effect other necessary operations.

The line circuits (LCs) 14 are provided in number equal to the number of the subscribers connected to the exchange 10, whereas the numbers of the trunk circuits (TRKS) 11, the service trunks (SVTs) 12 and the dial pulse receiver circuits (DPRs) 16 are designed to be less than the number of the subscribers because of their failure rates. Since the latter circuits are used in common by all the subscribers, they are collectively referred to as common control circuit. With the exchange 10 configured in this way, the dial pulse receiver circuits 16 cannot serve all the subscribers when they place their telephones off-hook simultaneously during emergency situations. Accordingly, preparations cannot be made for receiving all the telephone numbers, and as a result, dial tones for establishing connections are not sent to some of the calling subscribers from the service trunks (SVTS).

In other words, if the throughput of the exchange is exceeded due to simultaneous calling from a majority of the telephone subscribers, some of them cannot even hear dial tones and are forced to abandon the call. When a majority of the subscribers place their telephones off-hook simultaneously during emergency situations, line congestion is caused on the exchange. This naturally requires the subscribers to repeat calling for connection. As described above, the prior art has the drawback that the throughput of the exchange is exceeded when a majority of the telephone subscribers attempt to call simultaneously, and thus the subscribers become unable to even hear dial tones, and therefore no actual communications means is provided.

SUMMARY OF THE INVENTION

It is an object of the present invention to provide an emergency telephone system which allows communications even during congestion of an exchange.

It is another object of the present invention to provide an emergency exchange which prevents incomplete calls, involving useless path connections and holding common trunks, by securing emergency line resources to successively establish reliable connections with the subscribers during congestion.

It is yet another object of the present invention to provide an emergency telephone capable of sending the telephone number of the receiving party and messages during emergency situations.

In order to solve the problems mentioned above, the emergency telephone system according to the present invention is equipped with an exchange comprising:

control means for allocating one or more trunk lines and common control circuits as emergency line resources;

means for selecting and connecting the subscriber lines in a predetermined order through the secured common control circuits to send calling signals;

means for detecting answers to the calling signals to input receiving party-designating signals designated by the subscribers; and means for conducting processing for connection with the receiving parties based on the receiving party-designating signals through the emergency trunk lines; and with telephones comprising:

means for detecting incoming calls from the exchange;

means for sending receiving party-designating signals at a predetermined time after detection of the calls in or after receipt of a predetermined signal; and means for sending prerecorded messages.

In addition, the control means has means for allocating a predetermined number of trunk lines and common control circuits as the emergency line resources when a predetermined number of the common control circuits are detected to be used over a predetermined time.

As mentioned above, the exchange according to the present invention comprises:

control means for allocating one or more trunk lines and common control circuits as emergency line resources; means for selecting and connecting the subscriber lines in a predetermined order through the secured common control circuits to send calling signals;

means for detecting answers to the calling signals to input receiving party-designating signals designated by the subscribers; and means for conducting processing for connection with the receiving parties based on the receiving party-designating signals through the emergency trunk lines.

Also, as mentioned above, the control means has means for allocating a predetermined number of trunk lines and common control circuits as the emergency line resources when a predetermined number of the common control circuits are detected to be used over a predetermined time.

Further, the exchange according to the present invention, as an telephone exchange which has line circuits connected to the subscriber lines, trunk lines and switches, and serves to connect the lines, is equipped with:

a circuit for detecting congestion of the line circuits;

a congestion management table for the subscribers;

an emergency service trunk circuit;

recording means for recording information in the congestion management table which identifies at least the subscribers other than those engaging in conversation when the congestion of the line circuits is detected; and control means for securing an emergency trunk line and common control circuits, which calls up the not-yet-serviced subscribers in succession through the emergency trunk circuit and the common control circuits based on the congestion management table, to connect the answering, not-yet-serviced subscribers to designated receiving subscribers through the emergency trunk lines.

The control means secures at least one open trunk line and common control circuit in the order of call termination after detection of the congestion.

The telephone according to the present invention is equipped with incoming call-detecting means for detecting incoming calls from the exchange; and answering means for sending a receiving party-designating signal at a predetermined time after detection of the incoming call by the incoming call-detecting means, or after detection of a predetermined signal.

Further, the answering means has message sending means for sending a prerecorded message at a predetermined time after sending the receiving party-designating signal, or after detection of a predetermined signal.

DESCRIPTION OF THE PREFERRED EMBODIMENTS

An embodiment of the present invention will now be explained with reference to the drawings.

Figure 1:
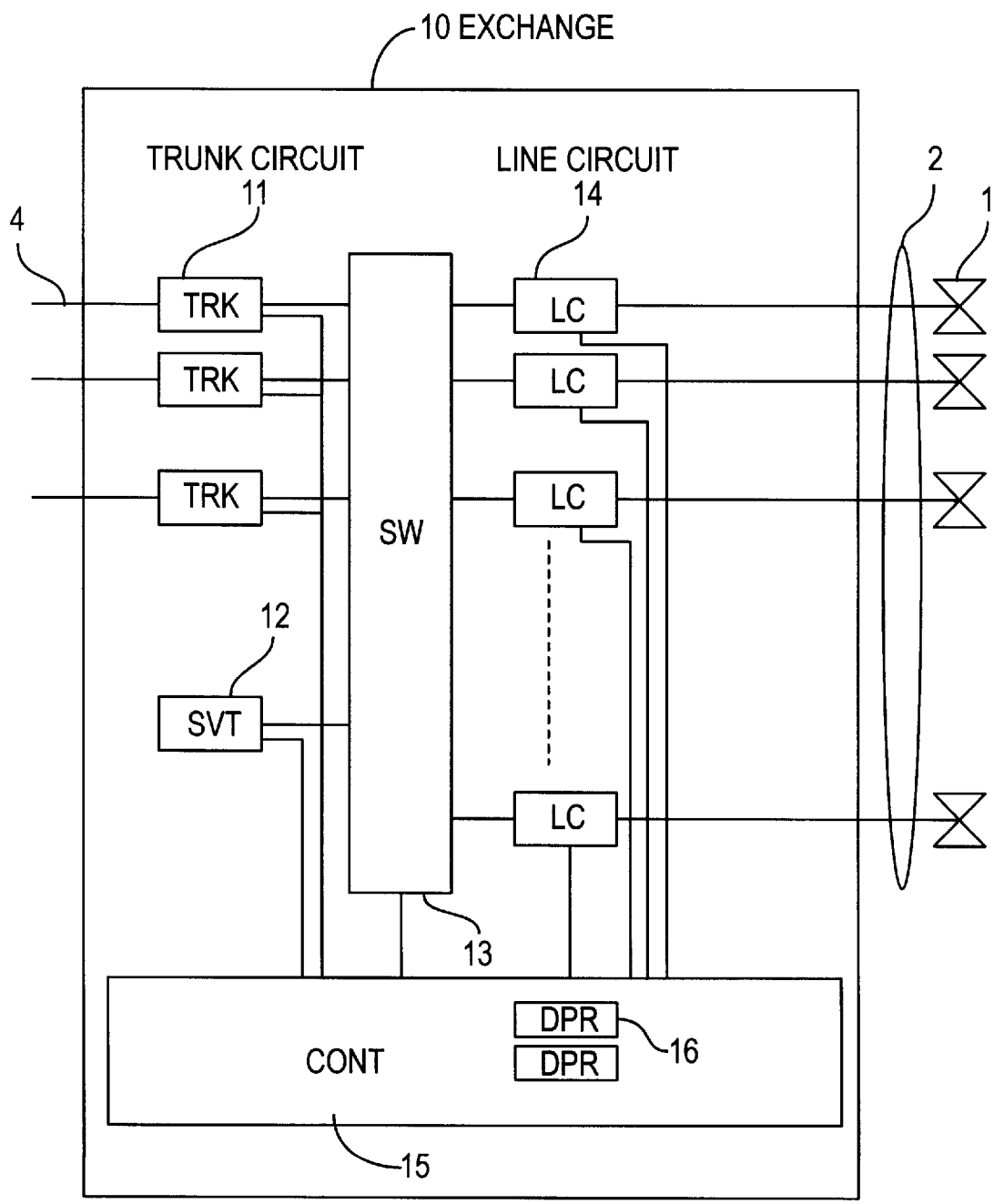
FIG. 1 is a block diagram illustrative of the configuration of an exchange according to the prior art.
Figure 2:
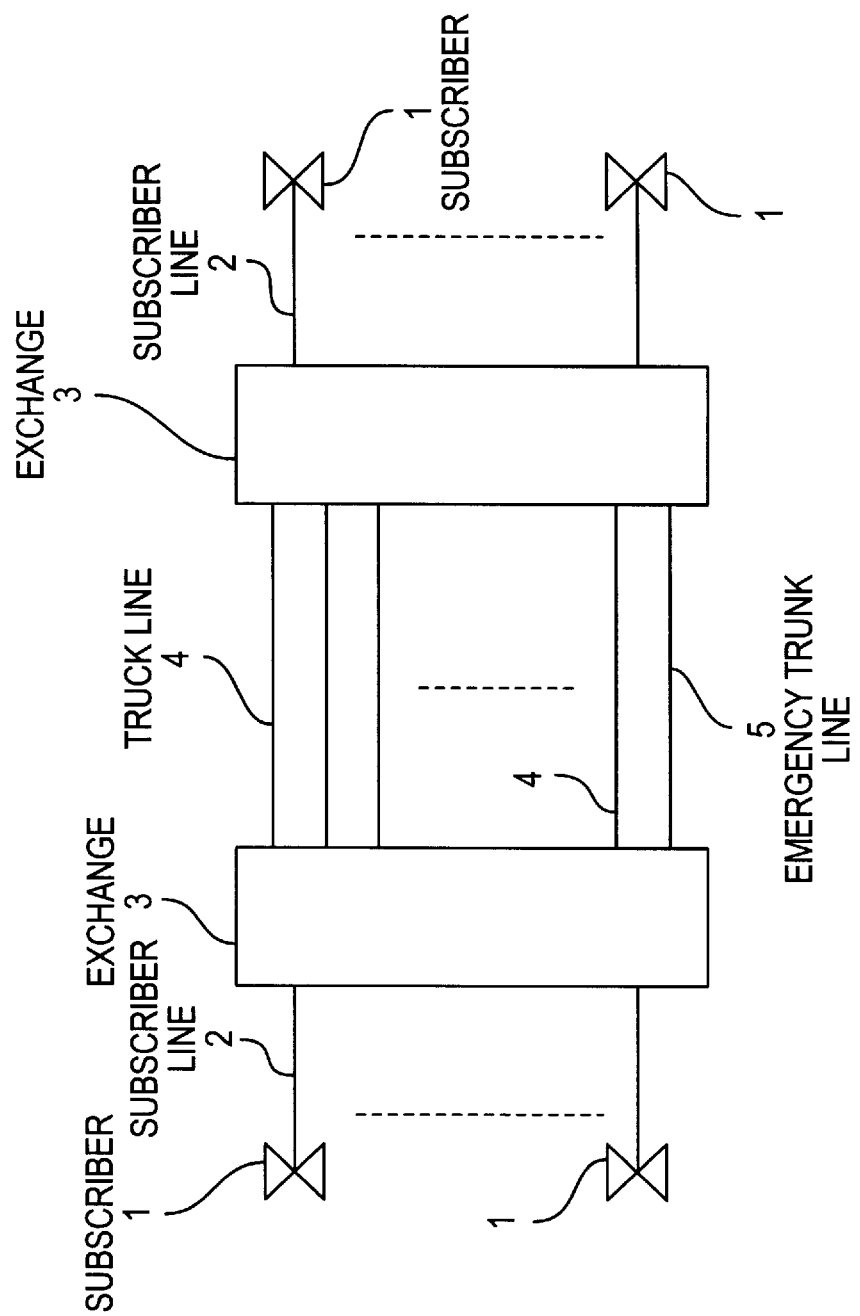
FIG. 2 is a block diagram illustrative of the configuration of an emergency telephone communications system according to the present invention.

FIG. 2 is a block diagram illustrative of the entirety of an emergency telephone communications system according to the present invention. The emergency telephone communications system according to the present invention is a telephone communications system comprising subscriber terminals 1 such as telephones which are connected to an exchange 3 via a public line 2, with trunk lines 4 as transmission paths connecting between the exchanges. Here, the trunk lines between the exchanges comprise at least one emergency trunk line 5 for use during emergency situations.

This configuration allows answering subscribers who have called, to have the line connected with the receiving parties during emergency situations. This emergency trunk line 5 usually has the same functions as the other trunk lines. In cases where all the common control circuits are occupied over a predetermined time, a control circuit is configured in the control section 15 so as to secure the trunk line and the common control circuit which have been first released by termination of a call in this state, as the emergency trunk line 5, etc. for use during emergency situations.

Figure 3:
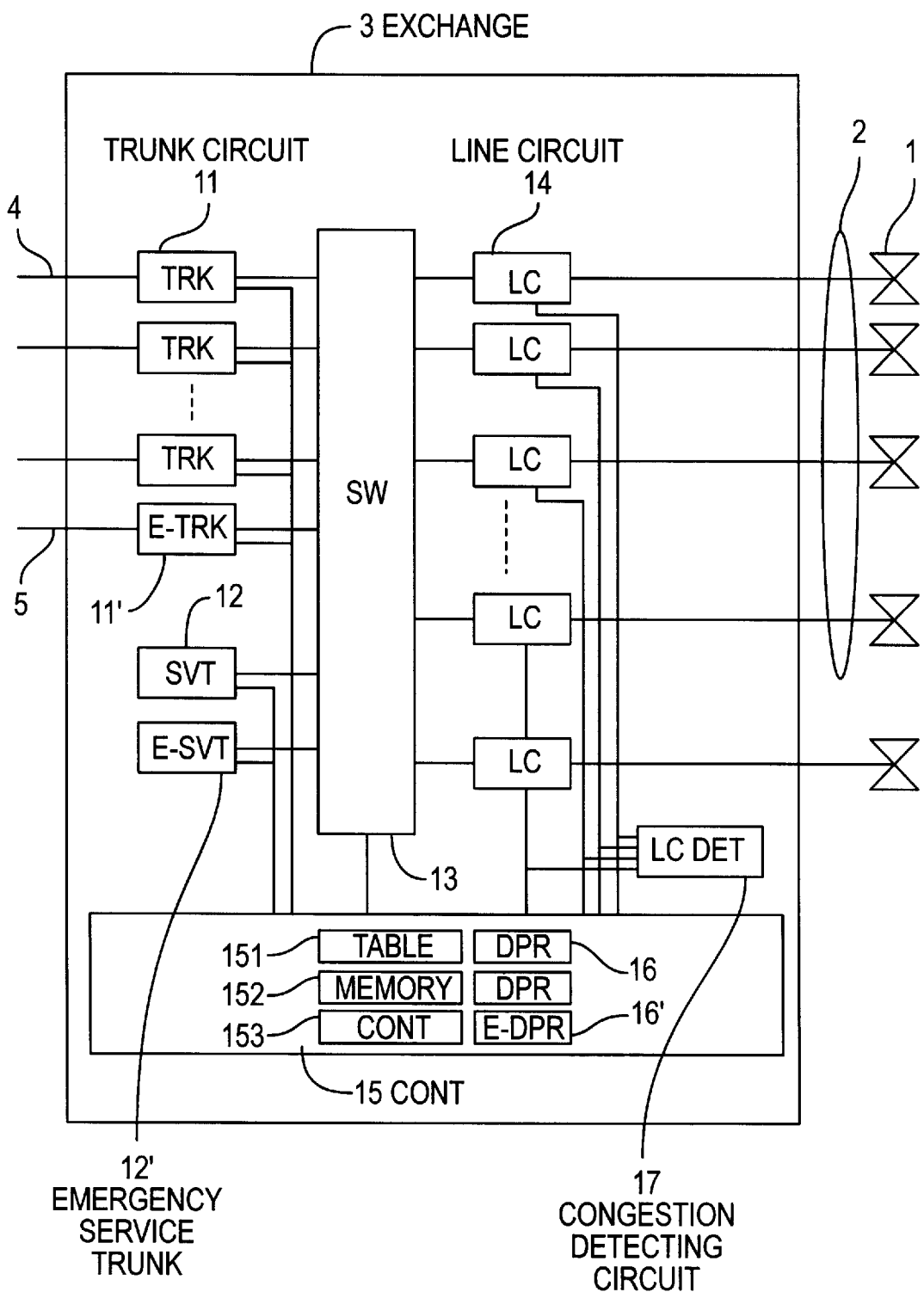
FIG. 3 is a block diagram illustrative of the configuration of the exchange shown in FIG. 2.

FIG. 3 is a block diagram illustrative of a specific configuration of the exchange 3 according to the present invention. The exchange 3 is constructed with, in addition to the components of the conventional exchange, a line circuit congestion-detecting circuit (LC DET) 17, an emergency dial pulse receiver circuit (E-DPR) 16, an emergency service trunk (E-SVT) 12', and a control section (CONT) 15 which includes a congestion management table 151, recording circuit 152 for recording service information and control circuit 153.

The operation of the exchange 3 will now be explained with reference to FIG. 3. Upon detection of more than a predetermined number of the line circuits (LC) 14 in the off-hook state, the LC congestion-detecting circuit 17 sends an LC congestion generation signal to the control section (CONT) 15. The control section (CONT) 15 automatically initiates operations for processing during congestion described below (hereunder the processing during congestion will be referred to as "emergency processing") upon detection of the LC congestion-detecting signal.

The exchange 3 has the congestion management table 151 listing management numbers assigned to the subscribers to which the exchange is designed to be connected, and the recording circuit 152 for the table. When the emergency processing is initiated, the contents of the congestion management table 151 are entirely cleared, and "unfinished" marks are recorded for all the subscribers. After initiation of the emergency processing, the exchange 3 records, in the congestion management table 151, "service completed" marks for the subscribers engaging in conversation, or those ready for line connection by normal processing or emergency processing described below.

The exchange 3 selects, in a predetermined order, the subscribers marked with "unfinished" in the congestion management table 151 and whose telephones are not in the off-hook state, to send ringing signals through the line circuits (LC) 14. In cases where the subscribers place the telephones off-hook within a predetermined time, the control section (CONT) 15 controls the emergency dial pulse receiver circuit (E-DPR) 16' to be ready for reception. Thereafter, the switch (SW) 13 is controlled to connect the emergency service trunk (E-DPR) 12' to the line circuits (LC) 14 to send a given tone signal or a voice message to the subscribers. This voice message may be, for example, "The exchange is now overloaded, but the emergency line may be used for a limited period of time. Please dial if you want to call." Upon receipt of this message, each subscriber is allowed to dial the telephone number of the receiving party.

The exchange 3 analyzes the telephone number designating the receiving party from each subscriber, and calls up the exchange at the receiving end through the emergency trunk circuit (E-DPR) 11'. The exchange at the receiving end analyzes the received telephone number and performs operations necessary for connection, and finally sends an answer back upon detection of the off-hook state initiated by the receiving subscriber. The exchange 3, upon receipt of this answer back, records "service completed" in the field of the related subscriber in the congestion management table 151.

When the subscriber has actually terminated the conversation, the same processing is conducted for the next subscriber marked with "unfinished" in the congestion management table 151 and whose telephone is not in the off-hook state. All the subscribers may thus be ensured a chance to communicate in succession.

Here, in cases where the duration of a call is prolonged, a long time passes until selection of the next subscriber, thus creating a longer time demand for accessing many subscribers. Therefore, in such cases, restricted duration of a call is allocated to each subscriber during conversation to forcedly interrupt the connection if the call continues over a predetermined time. For example, the message "please end the conversation" is sent prior to the forced interruption of the connection.

Figure 4:
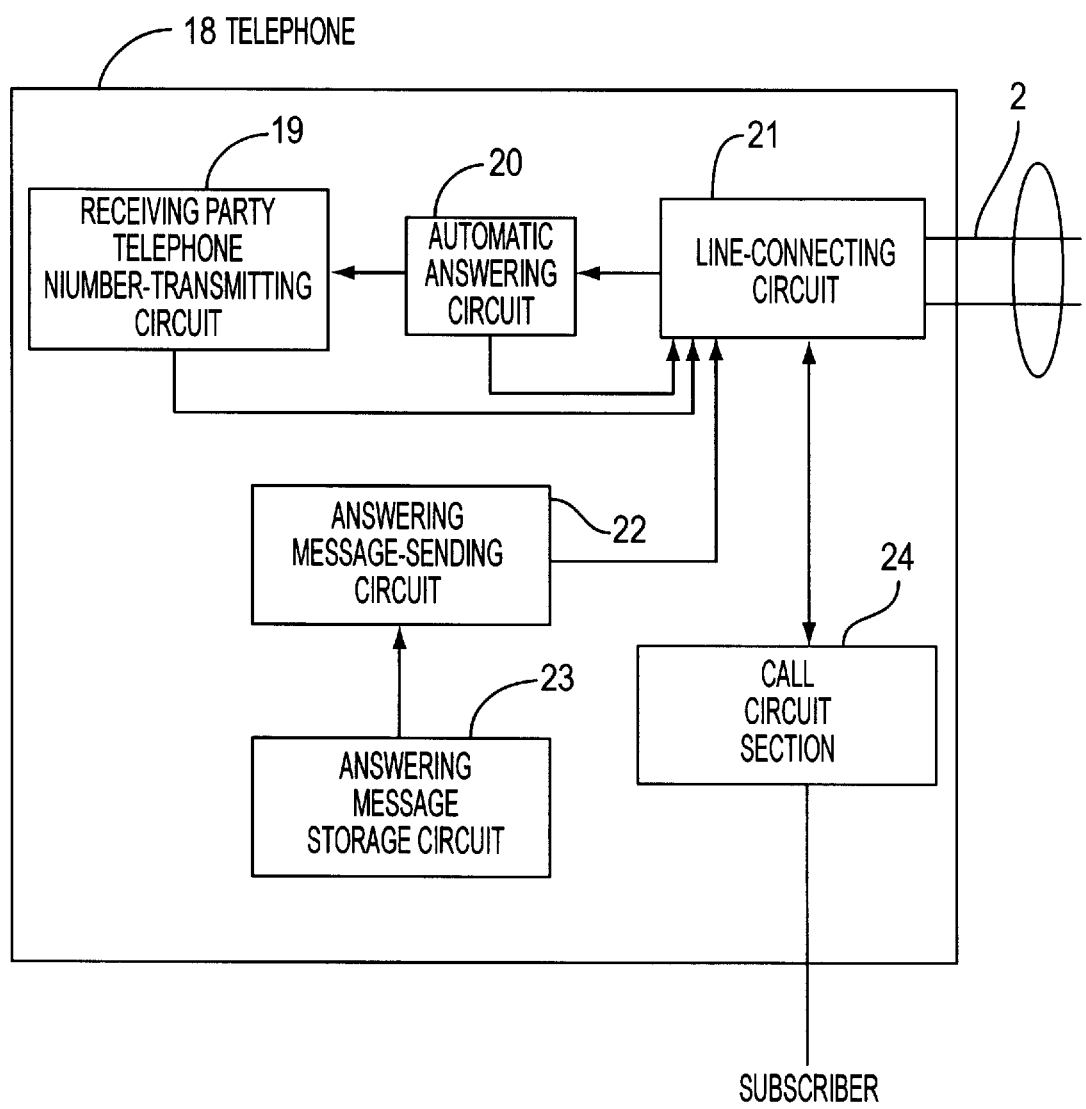
FIG. 4 is a block diagram illustrative of the configuration of the telephone shown in FIG. 2.

FIG. 4 is a block diagram illustrative of an embodiment of the emergency communications telephone according to the present invention. Referring to FIG. 4, in cases where the subscriber does not place the telephone 18 off-hook within a predetermined time after detection of a ringing signal from the exchange 3 by the telephone 18, an automatic answering circuit 20 is automatically activated for the off-hook state. Thereafter, the receiving party telephone number-transmitting circuit 19 is automatically activated when a predetermined time has passed after receipt of the dial tone or message described above. The receiving party telephone number-transmitting circuit 19 sends the previously stored telephone number of the receiving party to the exchange 3 using dial pulses or by dual-tone multi-frequency signaling (DTMF). The automatic answering circuit 20 then monitors a ringback tone. When the ringback tone has been detected and has trailed away, or when a predetermined time has passed after sending the receiving party-designating signal, a message previously stored in an answering message storage circuit 23 is sent through an answering message-sending circuit 22 a predetermined number of times, and the conversation is then ended by placing the telephone on-hook.

The details of the emergency processing mentioned above will now be explained with reference to the drawings.

Figure 5:
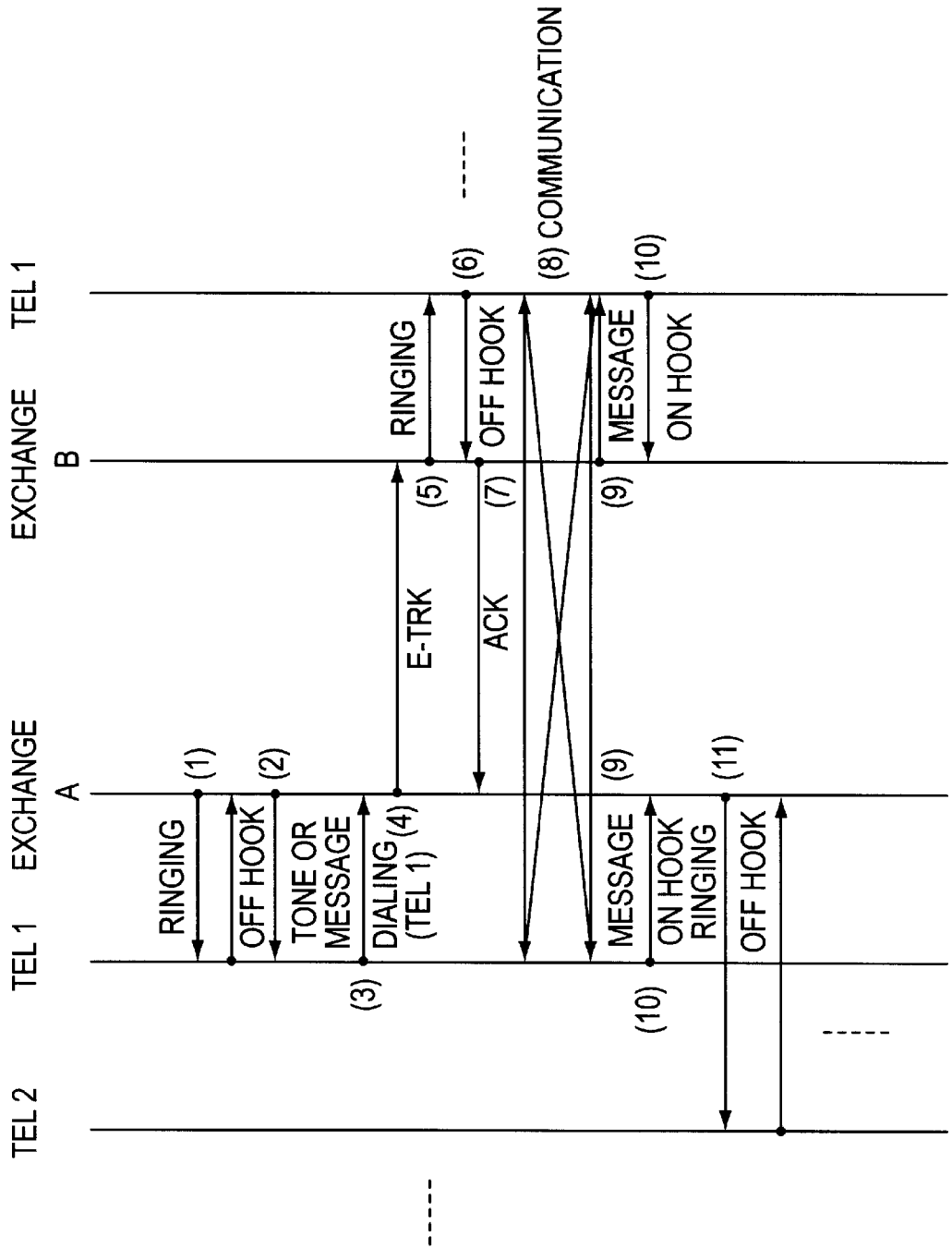
FIG. 5 is a sequence diagram illustrative of the processing operations according to the present invention during congestion.

FIG. 5 is a sequence diagram illustrative of the operations for the emergency processing. Referring to this drawing, a plurality of subscribers (for TEL. 1, TEL 2, . . . ) are connected to EXCHANGE A. Likewise, subscribers (for TEL. 1', TEL 2', . . . ) are connected to EXCHANGE B. As an example, an explanation will now be given regarding the case where the congested state of the plurality of subscribers connected to EXCHANGE A is detected by a congestion detecting circuit 17 provided in EXCHANGE A. Ringing signals are sent from EXCHANGE A to the subscribers who are marked with "unfinished" in the congestion management table 151 and whose telephones are not in the off-hook state, for example, the subscriber for TEL. 1 ((1) in FIG. 5).

When the subscriber for TEL. 1 places the telephone off-hook in response to the ringing signal, a given tone signal or voice message is sent to the subscriber from EXCHANGE A ((2) in FIG. 5).

Here, in cases where the subscriber for TEL. 1 cannot place the telephone off-hook within the predetermined time, the telephone is automatically placed off-hook, and the telephone number is then sent ((3) in FIG. 5).

The telephone number mentioned above is then sent from EXCHANGE A to EXCHANGE B at the receiving end via the emergency trunk (E-TRK) ((4) in FIG. 5).

EXCHANGE B sends a ringing signal to the receiving subscriber for TEL. 1' which has been designated by the telephone number, to call up TEL. 1' ((5) in FIG. 5).

TEL. 1' is placed off-hook ((6) in FIG. 5).

An answer back is sent from EXCHANGE B to EXCHANGE A

EXCHANGE B sends a ringing signal to the receiving subscriber for TEL. 1' which has been designated by the telephone number, to call up TEL. 1' ((5) in FIG. 5).

TEL. 1' is placed off-hook ((6) in FIG. 5).

An answer back is sent from EXCHANGE B to EXCHANGE A ((7) in FIG. 5).

Communications are performed between TEL. 1 and TEL. 1' ((8) in FIG. 5).

Here, when the duration of the call extends beyond the limited period of time set for the exchanges during emergency situations, the exchanges send "service completed" messages ((9) in FIG. 5).

The subscribers who have received the messages place their telephones on-hook ((10) in FIG. 5). Here, since no conversation is in progress when TEL. 1 automatically originates a call, there are no cases where time is spent up to the end of the limited period of time mentioned above.

After completion of the foregoing operations, the same emergency processing is conducted by EXCHANGE A for one of the telephones other than TEL. 1 which are marked with "unfinished" in the congestion management table 151 and are not in the off-hook state, for example, TEL. 2 ((11) in FIG. 5). predetermined trunk line as the emergency trunk line as well. Alternatively, they may be configured so that the processing operations for securing the emergency trunk line, resetting the congestion management table 151 and other purposes may be manually effected based on signals from the congestion detecting circuit 17.

The sequential connecting (calling) operations for the subscribers during emergency situations may be effected under limits by the types and locations of the telephones, the locations under emergency conditions, information regarding callings after occurrence of disasters, etc. In addition, the sequence of connection to the subscribers may be set assigning priorities thereto. Setting for the control in such a case may be made with only minor changes, including the resetting order for the congestion management table 151 and addition of information on the priorities.

The emergency processing for telephone exchanges in the congested state may be designed so that it is conducted only once and restored thereafter to the normal processing, or is repeated a predetermined times or over a predetermined period of time. Also in this case, the congestion management table 151 is designed to be cleared or reinitialized under appropriate conditions each time it is conducted.

In addition, although the foregoing description is focused on the case of emergency telephones where the receiving party telephone number-transmitting circuit 19 stores only one telephone number and only one answering message, it is apparent that many applications may be developed, including storage of a plurality of items of information, and selecting and sending a particular one or more of them depending on the conditions.

As described above, when exchanges are overloaded due to simultaneous calling by a majority of the subscribers during emergency situations, the present invention allows all the subscribers to send messages about their safety to important parties, though after having waited for a predetermined time, and thus produces the notable effect of a vast improvement in service.

In addition, securing emergency line resources, and sequential connection to the subscribers during the congested state produce notable effects in that incomplete calls, such as only path connections and holding of common trunks, are prevented, and the congested state of exchanges are effectively restored to the normal state without delay.

Also, since the telephone according to the present invention has the function of automatically sending the receiving party telephone numbers and messages, it produces notable effects in that calling subscribers are free of inconveniences, including extra time expenditure and the awkwardness of holding the telephones for a long time.

What is claimed is:

1. An emergency telephone communications system for communicating a telephone signal during congestion of an exchange, comprising:

an exchange having control means for allocating one or more trunk lines and common control circuits as emergency trunk line resources between exchanges; means for selecting and connecting subscriber lines in a predetermined order through the allocated common control circuits to send calling signals; means for detecting answers to the calling signals; means for inputting receiving party-designating signals designated by subscribers; and means for conducting processing for connection with receiving parties based on said receiving party-designating signals through said emergency trunk lines; and telephones having means for detecting incoming calls from said exchange; means for sending receiving party-designating signals at a predetermined time after detection of the calls in or after receipt of a predetermined signal; and means for sending prerecorded messages.

2. An emergency telephone communications system as claimed in claim 1, wherein said control means allocates a predetermined number of trunk lines and common control circuits as said emergency line resources when a predetermined number of said common control circuits are detected to be used over a predetermined time.

3. An exchange for use in an emergency telephone communications system, comprising:

control means for allocating one or more trunk lines and common control circuits as emergency trunk lines resources between exchanges;

means for selecting and connecting subscriber lines in a predetermined order through the allocated common control circuits to send calling signals;

means for detecting answers to the calling signals;

means for receiving party-designating signals designated by subscribers; and means for conducting processing for connection with receiving parties based on said receiving party-designating signals through said emergency trunk lines.

4. An exchange as claimed in claim 3, wherein said control means allocates a predetermined number of trunk lines and common control circuits as said emergency line resources when a predetermined number of said common control circuits are detected to be used over a predetermined time.

5. A telephone exchange which has line circuits connected to subscriber lines, trunk lines and switches, and serves to connect the lines, further comprising:

a circuit for detecting congestion of line circuits;

a congestion management table for the subscribers;

an emergency service trunk circuit;

recording means for recording information in the congestion management table which identifies at least the subscribers other than those engaging in conversation when the congestion of the line circuits is detected; and control means for securing an emergency trunk line and common control circuits, and serving to call up the not-yet-serviced subscribers in succession through the emergency service trunk circuit and the common control circuits based on the congestion management table, to connect answering, not-yet-serviced subscribers to designated receiving subscribers through the emergency trunk line.

6. A telephone exchange as claimed in claim 5, wherein said control means secures at least one open trunk line and common control circuit in the order of call termination after detection of the congestion.

7. A telephone exchange as claimed in claim 6, which sends a predetermined message to the subscriber engaging in conversation and then forcibly interrupts the conversation if the conversation continues over a predetermined time.

* * * * *